Aug. 28, 1945.  A. C. FERGUSON  2,383,639
METALLIC AWNING
Filed Nov. 30, 1944  2 Sheets-Sheet 1

Inventor
Albert C. Ferguson
By Philip A. F. Sewell
Attorney

Aug. 28, 1945.   A. C. FERGUSON   2,383,639
METALLIC AWNING
Filed Nov. 30, 1944   2 Sheets-Sheet 2
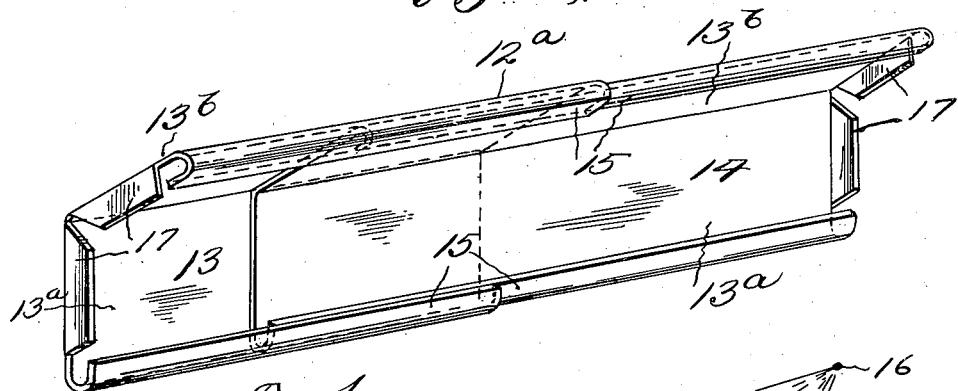
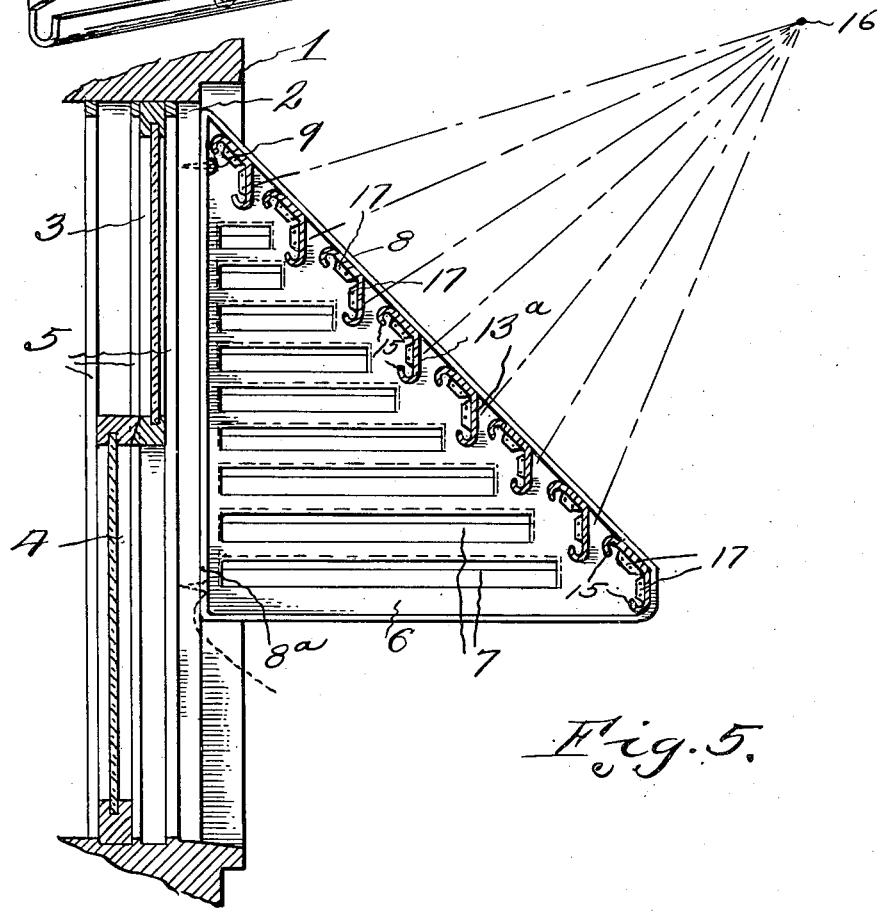
Inventor
Albert C. Ferguson
By Philip A. H. Terrell
Attorney Patented Aug. 28, 1945

2,383,639

UNITED STATES PATENT OFFICE 2,383,639

METALLIC AWNING

Albert C. Ferguson, Jacksonville, Fla.

Application November 30, 1944, Serial No. 565,958

5 Claims. (Cl. 160—62)

The invention relates to metallic awnings adapted to be attached to the outer face of a window frame, and provided with means whereby it can be laterally extended according to the width of the window opening and provided with louvers formed from telescopic sections having their outer ends rigidly attached to the side members of the awning. Also to so shape the horizontal louvers whereby air may circulate downwardly and upwardly therebetween and at the same time sun rays engage vertical portions of the louver for deflecting the sun rays downwardly so they will not pass through the window.

A further object is to provide the ends of the extensible louvers with right angle flanges at angles to each other, so that when the flanges are attached by spot welding or otherwise to the rigid end section the extensible louvers are rigidly braced and maintained with their flanges at angles to each other.

A further object is to provide the transverse louver sections along their longitudinal edges with in-turned flanges for facilitating the sliding adjustment, bracing the edges and allowing sufficient spring action in the flanges so that the sections will easily slide.

A further object is to form the side members of the awning from sheet metal, substantially triangular in shape and provided with a continuous right angle marginal flange for bracing the side members, and engaging the outer faces of the upper flanges of the transverse louvers for holding the louvers in adjusted position at all times and during the assembly when the flanges are being welded to the side members. Also to provide the side members with outwardly struck louvers for allowing an upward circulation of air, and excluding the entrance of rain. The device is primarily designed for providing a circulation of air and ventilation through a window and not necessarily for excluding the passage of rain between the louvers, and for use in southern climates where the main problem is to exclude sun rays and prevent the accumulation of heat under the awning.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 4 is a perspective view of one of the extensible louvers, looking at the same from the inside.

Figure 5 is a vertical longitudinal sectional view taken on line 5—5 of Figure 1, showing the awning attached to the outside of the window frame.

Figure 1:
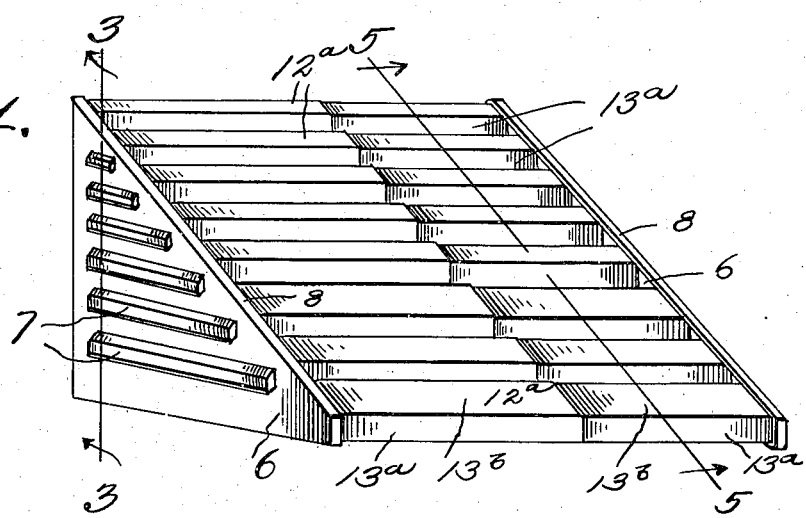
Figure 1 is a perspective view of the metallic awning.
Figure 2:
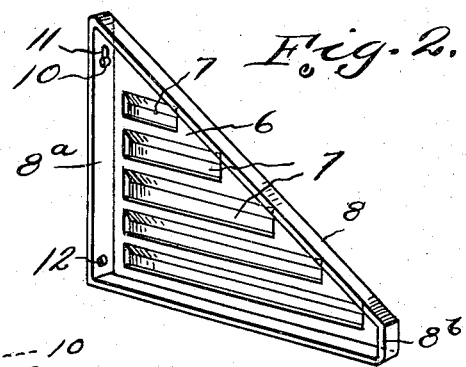
Figure 2 is a perspective view of one of the side members.

Referring to the drawings, the numeral 1 designates a window opening, and 2 the frame therein. Slidably mounted in the window frame 2 is an upper sash 3 and an upper sash 4, mounted in the usual manner between parting strips and outside strips 5. The device is attached to the outer face of the frame 2.

Figure 3:
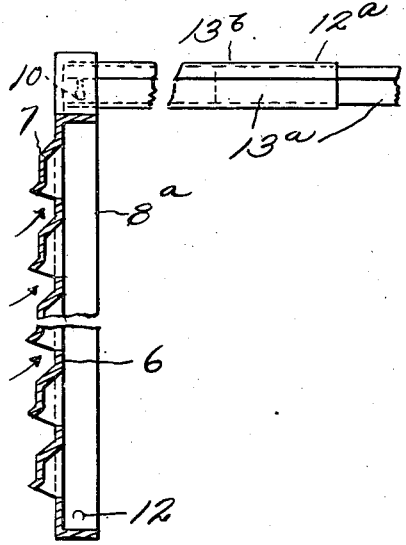
Figure 3 is a vertical transverse sectional view taken on line 3—3 of Figure 1.

The awning comprises rigid sheet metal side members 6 having horizontal Z-shaped louvers 7, struck outwardly therefrom to form upwardly extending air passages, through which air currents will pass upwardly and under the awning in the direction of the arrows shown in Figure 3, and at the same time the outstanding Z-shaped louvers will exclude the entrance of water, and sun rays.

The side members 6 are preferably triangularly shaped, and provided with inwardly extending marginal flanges 8, which brace the side members 6, and at the same time form a guide during the assembling of the transverse louvers. The vertical flanges 8a engage the outer face of the window frame 2, as clearly shown in Figure 5, and attached to the window frame by means of headed screws 9 carried by the window frame, and which are received in the enlarged portions 10 of elongated apertures 11 so that when the awning is lowered slightly the upper end thereof is positively anchored to the window frame, and after which screws are passed through the apertures 12 in the lower ends of the flanges 8, hence it will be seen that the awning is rigidly supported in position, and in a manner whereby it can be easily applied or removed.

The transverse louvers 12a are obtusely angled in cross section, and formed from telescopic sections 13 and 14. The marginal edges of the louver sections 13 and 14 are provided with in-turned flanges 15 for forming the telescopic connection. It will be noted that the flanges 15, not only brace the longitudinal edges of the sections, but being spaced outwardly from the body of the sections there will be sufficient spring action whereby the telescopic action can take place without binding. The louver sections 13 and 14 have their flanges 13a and 13b at obtuse angles so their flanges 13a, when assembled, will be in a vertical plane so light rays from the point 16, for instance sun, will hit the vertical surfaces and be deflected in a downward direction so they will not pass through the glass in the window sash. It will also be seen that the flanges 13b engage the underside of the downwardly inclined flanges 8, thereby bracing and preventing twisting of the telescopic louvers and properly angling the same so they may be quickly attached to the end sections 6 by welding the flanges 17 to the side members, clearly shown in Figure 6. It will be noted that the flanges 17 are at angles to each other, hence in combination with the engaging flanges 8 of each side section the telescopic louver sections will be rigidly mounted at each end in perfect registry, hence the inner ends of the louver sections will easily accommodate themselves to the telescopic action. The lower telescopic louver has its vertical portion 13a in engagement with a vertical portion 8b of the flange 8 in each side members, hence a rigid structure is provided at this point, which will lend rigidity to the lower end of the awning.

From the above it will be seen that a ventilated awning is provided for windows, which will allow the free circulation of air upwardly, downwardly or transversely, and at the same time will exclude heat rays from passing through a window. It will also be seen that the device will prevent driving rains being forced through the window if either sash is open, as the water will hit the vertical flanges 13a and pass downwardly by gravity. It is contemplated manufacturing the device from a light metal, for instance aluminum, however applicant does not limit himself in this particular.

The invention having been set forth what is claimed as new and useful is:

1. A rigid awning for window openings, said awning comprising side members, inwardly extending marginal flanges carried by said side members, the upper side of said awning being formed from spaced louvers, said louvers being formed from telescopically engaged sections, the outer ends of said telescopically engaged sections being rigidly anchored to the side members and braced by engagement with the marginal flanges of the side members.

2. A device as set forth in claim 1 wherein the telescopically engaged sections are obtusely shaped in vertical cross section, thereby providing vertical ray deflecting flanges and upwardly inclining flanges for engagement with the under side of the marginal flanges of the side sections and anchoring flanges at angles to each other carried by the inner sides of the louver section outer ends and anchored to the side members.

3. A device as set forth in claim 1 wherein the marginal flanges of the side sections conform to and engage both flanges of the outer ends of the telescopic sections of the lower louver.

4. The combination with a window frame, of a rigid transversely adjustable ventilating awning, said awning comprising side members connected to the sides of the window frame, said side members being connected together by transversely extending telescopic louvers, inwardly extending marginal flanges carried by the side members, said marginal flanges engaging the outer sides of the louvers on their inclined flanges, the ends of said louvers being anchored to the inner sides of the side members.

5. A device as set forth in claim 4 wherein the telescopic louver sections are obtusely angled in transverse cross section with one of their flanges vertically disposed and brace flanges carried by the side members and egaging the outer faces of the other louver section flanges, whereby said louvers are rigidly braced when their sections are anchored to the side members.

ALBERT C. FERGUSON.